May 17, 1960   W. A. GORMAN ET AL   2,937,093
PROCESS FOR MANUFACTURING WHIPPED FATTY EMULSION
Filed Sept. 30, 1957
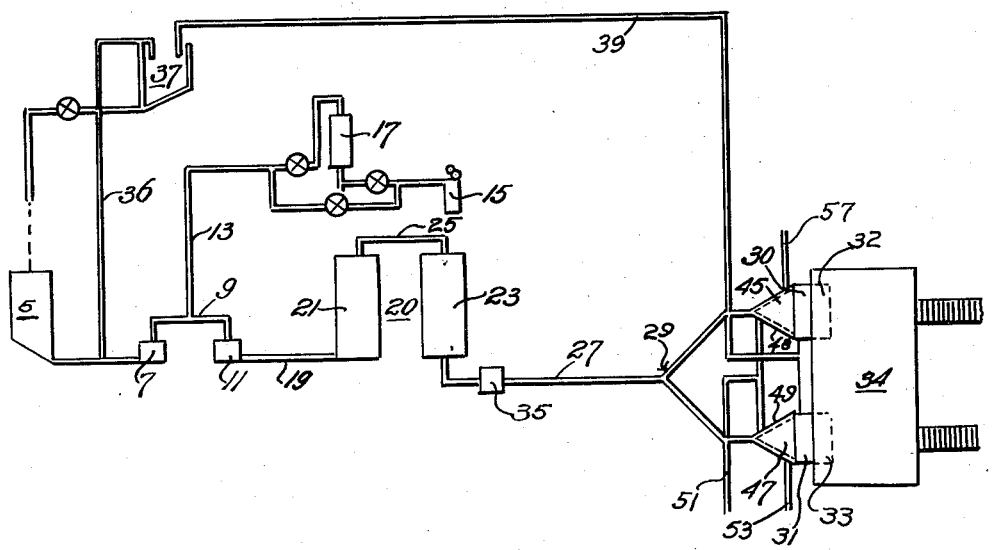
Inventors,
William A. Gorman,
Robert G. Christie.
George Howard Kraft.
by. Soans, Anderson, Luedeka &
Fitch
Attorneys ured 2,937,093
Patented May 17, 1960

2,937,093

PROCESS FOR MANUFACTURING WHIPPED FATTY EMULSION

William A. Gorman, Lake Bluff, Robert G. Christie, Glenview, and George Howard Kraft, Wilmette, Ill., assignors to National Dairy Products Corporation, New York, N.Y., a corporation of Delaware Application September 30, 1957, Serial No. 687,025

7 Claims. (Cl. 99—122)

This invention relates generally to the manufacture of whipped fat containing food products, such as butter and margarine, and more particularly the invention relates to the manufacture of such whipped food products in the form of a stick or bar.

The whipping and packaging of various fat containing food products, such as butter, margarine and cream cheese is known and has been practiced for many years. However, it has been the general practice to introduce such whipped product into open cups or containers, the product being introduced into such cup or container in a flowable condition. Heretofore, it has not been possible to satisfactorily package these whipped fat containing food products in the form of bars or sticks in conventional packaging equipment.

The prior attempts to form such a whipped, fat containing food product into the form of a bar or stick has resulted in a product of unsatisfactory character for sale or it has not been packagable on available, in-line packaging equipment. Such in-line packaging equipment receives the product, forms it into the shape of a bar or stick, and wraps the formed bar or stick with a wrapper, such as foil or parchment paper. Thus, the product provides a mandrel or form, in effect, for the wrapping material. The previous attempts at providing a satisfactory product for handling in the in-line equipment and for commercial sale have resulted in an unsatisfactory or unsatisfactorily formed product.

However, the forming of the whipped product into the shape of a bar or stick in a satisfactory condition is a desideratum as it makes possible the use of available packaging equipment and, in addition, provides more attractive and improved packaging of the product. Furthermore, the packaging of this product in the form of a bar or stick facilitates distribution in normal marketing channels.

It is a principal object of this invention, therefore, to provide a whipped fat containing food product in a condition for immediate packaging with available packaging equipment. Another object of this invention is the provision of a process which properly conditions the whipped product for packaging with conventional packaging apparatus. A particular object of this invention is the provision of an improved process for packaging whipped butter or margarine in the form of a bar or stick. Further objects and advantages of the invention will become apparent from consideration of the following description and accompanying drawing, in which:

Figure 1 is a schematic diagram of apparatus for packaging fatty product in accordance with this invention.

As used in this specification, "whipped product" means a product which includes more than about twenty (20) percent of gas, by volume, i.e., it has a density twenty (20) percent less than the unwhipped product. The term "fat containing food product," as used therein, means an edible food product which comprises more than about sixty-five (65) percent of a fat or mixture of fats, on a weight basis, the fats being substantially solid at room temperatures. In general, such food product will be butter and/or margarine, or a similar food product.

The process of the invention basically comprises the steps of heating a fat containing food product, such as margarine, to a temperature sufficient to substantially melt the fat. The product is then whipped to incorporate gas in an amount in excess of about twenty (20) percent, by volume (on an end product basis), whereupon the whipped product is cooled at a rapid rate to a temperature below its solidification point but is prevented from being set up by vigorous agitation. For purposes of this specification, the product in this condition is said to be in a "super cooled" condition. The super cooled product is shaped at about the time that setting occurs and it should not be extensively worked or substantially manipulated after such shaping. Working or manipulation after shaping results in granulation of the fat. The formed food product is then wrapped with packaging material.

The term "whipping" as used herein is used in a broad sense and refers to incorporation of gas into the fat containing product by any suitable means. The term "granulation" refers to the formation of fat particles which gives the product a coarse texture, which texture, in some cases, can be experienced organoleptically.

Now considering the invention in greater detail, and with particular reference to Figure 1 of the drawing. It will be appreciated that Figure 1 is a schematic illustration of one embodiment of the invention and is generally described here to provide a better understanding of the detailed description which is hereinafter set forth. A melted fat product is used in the apparatus. In the case of margarine, this mixture will usually comprise a fat phase, in an amount of about 80 percent, and an aqueous phase, in an amount of about 20 percent, which aqueous phase includes milk and salt. Color additives may be added to the fat product to provide the desired end product.

The melted fat product is drawn from a tank 5 into a pump 7, which is a positive pump, as distinguished from a centrifugal pump. The product is fed through line 9 into a second pump 11. This second pump is also a positive pump and overruns the first pump 7. In other words, the second pump 11 is pumping at a greater rate than the first pump 7, thereby creating a vacuum or a subatmospheric pressure in the line 9 between the pumps.

An inert gas, which does not substantially dissolve in the product, is introduced into the line 9 between the pumps through line 13 at a controlled rate so as to provide the desired whipping or overrun to the product. The gas is received from tank 15 and passes through a flow control apparatus 17 into the line 13.

While various inert gases may be used, it is most desirable to use nitrogen because of its limited solubility in the respective phases of the fatty product, as well as its non-oxidative character. In this connection, carbon dioxide gas tends to dissolve in the fat and moisture, and provides somewhat less uniform results.

From the pumps 7 and 11, the product containing the gas is pumped through line 19 into cooling means 20 which agitates and super cools the whipped mixture. A highly satisfactory means for effecting such super cooling of the mixture is a Votator unit which is manufactured by the Girdler Division of National Cylinder Gas Company. The Votator unit is chilled by the use of ammonia gas or other refrigerant, and provides rapid chilling of the whipped product with substantial agitation to a temperature below the solidification temperature of the fat product by assuring contact of the product with the refrigerated surfaces of the unit. This unit prevents setting of the product at the cool temperature. It will be understood, however, that various other refrigerating or cooling means may be employed, many of which means are commercially available.

In the illustrated diagram, the cooling means 20 comprises two tubes 21 and 23 which are interconnected by means of pipe 25. It will be understood, of course, that the number of tubes which are required are a function of the capacity of the unit, though a given number of tubes may be employed at various throughput rates.

The super cooled product, in fluid form, is discharged through line 27 and is fed to a splitting means 29 which serves to feed product to a packaging machine, or machines, through forming sections 30 and 31 into molding or printing heads 32 and 33. As previously indicated, these molding heads may be on a single machine, or may be on several machines. Desirably, the molding heads, which also serve to move the margarine to a wrapping station in the packaging machine 34, are so phased in respect of one another as to present a substantially constant back pressure to the system, e.g., in the line 27. However, because of the gas in the whipped product, some variations in the back pressure can be absorbed by the product. This, of course, is characteristic of whipped product and different difficulties arise in the case of unwhipped or conventional fat containing food products, such as unwhipped margarine or butter.

The product from the molding heads 32 and 33 is introduced into the packaging equipment 34 usually by moving the formed product to a position where the whipped product, in bar or stick form, is pushed therefrom and wrapped in conventional packaging materials, such as foil or parchment paper. The sticks or bars provide a mandrel about which the wrapping material is formed. The wrapped bars or sticks of the wrapped product are then cartoned and tempered, if desired, in a conventional manner.

In order to establish more uniformity of operation and to provide greater flexibility of operation of the equipment, a positive pump 35 may be placed at the outlet of the cooling means 20 in line 27. This pump 35 can be utilized to provide a desired pressure in the cooling means 20 as will become more apparent hereinafter.

Of course, various packaging machines can be employed but a particularly satisfactory unit is a modified Morpac machine, Model TF, which is widely used in the margarine and butter industry. This machine is modified to cause the molding heads to operate 180 degrees out of phase with one another to provide more even back pressure to the system.

Various by-pass arrangements may be provided for diverting the product from the system to a remelt kettle for reuse in the system. In this connection, the product may be diverted through line 36 ahead of the pumps 7 and 11 to a remelt kettle 37. In addition, the product may be diverted through line 39 and returned from the forming sections 30 and 31 to the remelt kettle 37. This provides flexibility of operation in the event that the packaging machine is shut down or the double pumps 7 and 11 are not operated.

We have found that in the case of whipped fat containing food product, the holding time between the cooling unit 20 and the packaging machine 34 is a function of the condition of the product out of the cooling unit 20. It has been found that the time between the cooling unit 20 and packaging machine 34, for a given cooling means 20, is a function of the output temperature and is critical in order to provide a satisfactory product. In the event that the product is not held for a sufficient period of time, it is liquid or too soft to print in the packaging machine 34 and, if it is held for too long a time between the cooling unit 20 and the packaging machine 34, the product granulates and is unsatisfactory. In this connection, the product is grainy or rough. Such graininess or roughness does not temper out after packaging and, accordingly, the product cannot be held between the Votator unit and packaging machine for an extended period.

As the temperature of the fatty product out of a given cooling unit 20 is increased, the time of holding between the cooling unit 20 and packaging machine 34 should be increased. Conversely, reducing the temperature of product out of the cooling unit requires a shorter holding time between the cooling unit 20 and packaging machine 34. From this relationship, the holding time can be designed for the output of the cooling unit 20. Of course, as more product is put through a cooling unit with a given amount of refrigeration, the higher the temperature of the product out of the unit. As indicated, such higher temperature requires additional holding time for satisfactory printing of the product.

The holding time may be varied by changing the rate of flow of product, the volume of the pipe 27, or the overrun of the product.

Output temperatures from the cooling unit 20 can be varied from about 30° F. to about 60° F. depending upon the solidification temperature of the fat product.

The amount of overrun, i.e., gas incorporation or whipping, within the temperature range above specified, is not critical to this invention and, in this connection, the overrun can vary from as low as about 20 percent to more than about 200 percent. The critical factor is the holding time of the fat between a given cooling unit 20 and the packaging machine 34.

The product normally enters the cooling unit 20 in a liquid condition for effecting the desired super-cooling of the product. In this connection, the temperature of the molten fat is normally above about 98° F. when it enters the cooling unit 20. Because higher temperatures necessitate extra cooling capacity, the lower temperatures are used.

Depending upon the capacity of the cooling unit 20 and the throughput rate, the product may exit from the unit at a temperature from about 30° F. to a temperature of about 60° F. Higher temperatures out of the cooling unit 20 generally result in a product which does not have the desired set or firmness for wrapping. Temperatures too low result in freezing of the aqueous phase or excess power requirements in the cooling unit 20.

The line 27 is desirably a one-inch pipe. In this connection, larger pipes have resulted in channelling of the product in the pipe. Channelling results from the hardening of a portion of the material on the inner surface of the pipe 27, thereby reducing the effective diameter of the pipe, and consequently, reducing the holding time in the line 27. This channelling gives erratic results, and accordingly, a pipe no larger in size than about one and one-half inch in diameter should be used for the line 27. A one inch diameter pipe provides excellent results and is preferred. While smaller pipes may be employed, this results in undue head pressure because of pipe friction so that the largest sized pipe which is feasible is desirably employed. The pipe should not rapidly change in diameter along its length to minimize channelling.

The effect of channelling can be reduced by heating the pipe as by placing a water jacket around the pipe. The use of such a water jacket permits the use of somewhat larger pipe diameters and the overcoming of localized channelling conditions. However, the use of such expediency is not altogether desirable because of the attendant cost of equipment and the inherent requirements connected with circulation of heated water.

The splitting means 29 is preferably a Y-shaped pipe section but it may be a rotating valve with the modified Morpac machine. The rotating valve is formed and operated so as to provide an amount of product to each molding head 32 and 33 at least in timed relation with the operation of the respective heads. The rotating valve, if used, is operated to provide several movements of product to the molding head 32 and 33 when it is receiving product. In other words, if a molding head is reciprocating at the rate of 100 cycles per minute, the rotating valve is operated to feed product to the molding head several hundred times per minute. The rotating valve may feed each molding head once per revolution or several times per revolution, depending upon its design. A rotating valve used in a commercial operation alternately fed two molding heads once per revolution. This valve operated at a speed greatly in excess of the number of strokes of the molding heads 31 and 33 and, in this connection, the use of speeds in excess of ten times the cycles of the molding heads have been employed.

The product, on entering the forming heads 30 and 31, is passed through nozzle sections 45 and 47, in which the cross-section of the pipe is changed from circular to rectangular, the latter cross-section being the size of a face of the print of the stick or bar. In order to prevent channelling in the nozzles 45 and 47, these nozzles are jacketed and the jackets 48 and 49 are supplied with warm water through pipe 51 and water exits through pipes 53 and 57. The water in the jackets 48 and 49 should not be so warm as to melt the product but should have a temperature sufficient to prevent channelling. In general, the temperature of the water should exceed about 65° F., and should not exceed a temperature of about 120° F., the temperature used being inversely proportional to the conductivity of the metal and directly proportional to the flow rate.

In general, the foregoing description has been in respect of the use of a single packaging machine 34. It will be understood, however, that the cooling unit 20 can feed two packaging machines 34 which are operated in parallel with suitable phased relation of the molding heads 32 and 33. With such parallel operation, two intermediate pumps should be utilized out of the cooling unit 20. These pumps, similar to the pump designated 35 in Figure 1, operate to adjust the feed between the two packaging machines and to maintain a satisfactory back pressure in the cooling unit 20. When such pumps are used, a splitting unit will be employed at the outlet of the cooling means 20 to divide the product between the two intermediate pumps.

In actual commercial runs, a margarine emulsion is prepared and introduced into the tank 5. The emulsion comprised a fat phase which included about 80 percent of the mixture and an aqueous phase which comprised about 20 percent of the mixture. The aqueous phase included salt and milk. Suitable coloring was added to the product. The emulsion is drawn from the tank 5 into pump 7 and then into pump 11. The pumps were run at a speed, relative to one another, to establish a subatmospheric pressure in the line 9. Nitrogen gas is fed from the tank 15 through the flow control apparatus 17 at a positive pressure of about 15 pounds per square inch (gauge) into the line 9.

The rate of flow of nitrogen is adjusted, in commercial operations, to provide an end product having the desired overrun, which for the following examples will generally be 50 percent overrun, i.e., a density one-third less than the unwhipped product.

*Example I*

In one commercial operation, the cooling means 20 comprised a two-tube Votator unit and, in this Votator unit, each tube had a diameter of 4.01 inches and was 48⅛ inches in length. In the Votator unit was a rotor which had a diameter of 3.20 inches and on which were mounted the usual scraper blades for scraping the inside of the tube and for maintaining refrigeration efficiency. The rotor was 46 inches in length and was carried on a shaft which had a diameter of 2⅜ inches. Accordingly, the net volume of each tube of the Votator unit was 234 cubic inches.

The pipe connecting the tubes of the Votator unit was one-inch sanitary pipe and had a volume of 18 cubic inches. The cooling means 20 and the splitting means 29 had a length of 13 feet and 7 inches and a volume of 106 cubic inches. The splitting means 29 comprised a Y-shaped pipe which enlarged to a diameter of 3 inches. This Y-shaped pipe had a volume of 63 cubic inches and connected to the forming heads 30 and 31 each of which had a volume of 58 cubic inches. There was a plate between the forming heads 30 and 31 and the molding heads 32 and 33 of the machine 34 each of which accounted for 3.4 cubic inches.

The product was run through the cooling means at a rate of 224 sticks per minute, each stick having a volume of 7.45 cubic inches. Accordingly, the product was flowing through the cooling unit 20 at a rate of 1670 cubic inches per minute. The temperature of product out of the cooling unit was 48° F. and the product had an overrun of 50 percent. The pressure at the head or inlet of the cooling unit was about 125 pounds per square inch. The resulting product, after wrapping, had a smooth texture, a very slight grain, but was quite satisfactory for commercial production.

*Example II*

In this example, the temperature out of the cooling means 20 was dropped to 47° F. and the other conditions were maintained the same as in Example I. The product had smooth texture and slight grain, but was satisfactory for commercial production.

*Example III*

In accordance with this example, the same conditions were used as in the previous example, but the temperature of the product out of the cooling means 20 was further dropped to 46° F. which resulted in some coarsening of the product but the product was still acceptable for commercial sale.

*Example IV*

In accordance with this example, the same conditions as in the previous examples prevailed except that the temperature of the product was further dropped to 45° F. out of the cooling means 20 which resulted in still further coarsening of the texture of the product and also resulted in discoloration of the front and back panels of the prints. This product is borderline for sales purposes and it is not desired that further lowering of the temperature of the output of the cooling means be accomplished. Furthermore, such further cooling results in higher cost of operation and is undesirable.

*Example V*

In accordance with this example, the same conditions prevailed as in Example I except that the temperature out of the cooling means 20 was raised to 49° F. The product had a smooth texture, a very slight grain, but it had good printability.

*Example VI*

In accordance with this example, the temperature out of the cooling means 20 was raised to 50° F. but other conditions prevailed as in the previous examples. The product was becoming slightly soft for good printing, though it was still printable. It had good texture.

*Example VII*

In accordance with this example, the temperature out of the cooling means 20 was further raised to 52° F. and the resulting product had good texture. However, it was becoming too soft to print and any further raises in temperature would result in unsatisfactory prints.

*Example VIII*

In this example, the cooling means 20 also comprised a Votator unit having two tubes which were the same as those used in Example I. Also an intermediate pump 35 was used having a volume of about 27 cubic inches. The same splitting means 29, nozzles 49 and 50, and forming tubes 30 and 31 were used as in Example I. The length of pipe, designated 27 in the drawing, was 216 inches and had a volume of about 140 cubic inches. The product had an overrun of 47 percent and the temperature of the product out of the cooling means 20 was about 52° F. so that the product left the first tube of the Votator unit at a temperature of about 68° F. The product entering the cooling means 20 had a temperature of about 98° F. The pressure out of the second tube of the Votator unit was 60 pounds per square inch.

The product was put through the cooling unit 20 at a rate to provide 193 prints per minute from the apparatus, and the product left the forming heads 30 and 31 at a temperature of 49° F. The intermediate pump was operated at a speed of 89 r.p.m.

The resulting product had good texture and good printability. By cutting off one-half of the splitting means 29 and, therefore, one of the nozzles 49 and one of the forming heads 30, the product was somewhat softer but still had good printability and good texture.

*Example IX*

In this example, the same physical set up was used as in Example VIII but the outlet temperature of the product from the cooling means 20 was raised to 61° F. so that the temperature of the product between the tubes of the Votator unit was 75° F. At a rate of 254 prints per minute, the product was too fluid to print and, therefore, such a high temperature could not be employed at this rate in this apparatus.

*Example X*

In this example, the temperature of product out of the Votator unit was 54° F. so that the temperature of the product intermediate the tubes of the Votator unit was 70° F. Otherwise, the same conditions prevailed as in the previous example. The resulting product exited from the forming tubes at a temperature of 56° F., and, while it had good grain and texture, it was too soft to print. It had an overrun of about 50 percent.

*Example XI*

In this example, the same conditions were utilized as in the previous example except that the splitting means was divided so that the product did not go through one-half the Y to the nozzles 49 and the forming means 30. Again, the product was too soft to print when a throughput rate of 254 prints per minute was used.

*Example XII*

In this example, the temperature of the product out of the Votator unit was adjusted to 50° F. and the product was printed at a rate of 254 prints per minute. The temperature of the product out of the forming heads was 51° F. and the overrun was 50 percent. The intermediate pump speed was 127 r.p.m. The product had good texture and good printability. The physical apparatus was the same as in Example VIII.

*Example XIII*

In this example, the same conditions prevailed as in the previous example except that one-half the Y was cut off so that the product did not enter the nozzle 49 and forming head 30. The resulting product had good grain but was poor in printability.

*Example XIV*

In this example, the product exited from the cooling means at a temperature of 50° F. so that the temperature between the tubes of the Votator unit was 66° F. The product was put through the apparatus at a rate of 193 sticks per minute. The product exited from the forming heads 30 and 31 at a temperature of 49° F. and it had an overrun of 47 percent. The intermediate pump was operated at a speed of 95 r.p.m. The product was grainy and not too satisfactory for commercial production.

*Example XV*

In this example, the same conditions prevailed as in the previous example except that the product did not go through one-half of the splitting means 29, the nozzle 49, or forming head 30. The product was somewhat softer but still grainy and it exited from the forming head 31 at a temperature of 45° F.

*Example XVI*

In this example, the product discharged from the cooling means 20 at a temperature of 55° F. and the temperature of product intermediate the Votator unit tubes was 70° F. The throughput rate was 193 sticks per minute and the temperature of product out of the forming heads 30 and 31 was 53° F. The intermediate pump was operated at a speed of 89 r.p.m. The overrun of the product was 47 percent and it had good grain but was somewhat soft. The apparatus was the same as described in Example VIII.

*Example XVII*

In this example, the same conditions prevailed as in the previous example except that one-half of the splitting means, the nozzle 49 and the forming head 30 were not utilized. The product exited from the forming head 31 at a temperature of 51° F. and while it had somewhat better grain than in the case of the previous example, it was softer and not printable.

*Example XVIII*

The margarine product exited from the cooling means 20 at a temperature of 53° F. and the temperature of the product intermediate the tubes of the Votator unit was 66° F. The throughput rate was 141 sticks per minute. The product exited from the forming heads 30 and 31 at a temperature of 52° F. and had an overrun of 39 percent. The intermediate pump 35 was operated at a rate of 74 r.p.m. The pressure at exit of the Votator unit was 50 pounds per square inch. The product had a coarse grain.

*Example XIX*

In this example, the same conditions prevailed as in the previous example except that one-half of the splitting means 29, the nozzle 49 and the forming head 30 were not utilized. The product exited from the forming head 31 at a temperature of 49° F. While the product had somewhat less coarse grain than in the previous example, it, nevertheless, was still coarse.

*Example XX*

In this example, the product exited from the cooling means 20 at a temperature of 55° F. so that the temperature of product between the tubes of the Votator unit was 67° F. The overrun of the product was 51 percent and the product exited from the forming heads at a temperature of 51° F. The intermediate pump was operated at a speed of 74 r.p.m. The throughput rate was 141 prints per minute. The product was somewhat less coarse than the product of the previous example but still had some coarseness.

*Example XXI*

In this example, the same conditions prevailed as in the previous example except that one-half of the Y, the nozzle 49, and the forming head 30 were not utilized. The product was still less coarse than in the case of the previous example.

*Example XXII*

In this example, the product exited from the cooling means 20 at a temperature of 57° F. The pressure at the exit of the Votator tubes was 40 p.s.i. The product exited from the forming heads at a temperature of 58° F. at a rate of 141 prints per minute. The product had an overrun of 51 percent and the intermediate pump 35 was operated at a speed of 74 r.p.m. The product had good grain and was printable through it was somewhat soft.

*Example XXIII*

In this example, the same conditions prevailed as in the previous example except that one-half of the Y 29, the nozzle 49 and the forming head 30 were not used. The product exited from the forming head 31 at a temperature of 51° F. The product had somewhat finer grain and smoother surface but was somewhat softer than the product which exited from the forming heads in the previous example. It was printable.

*Example XXIV*

In accordance with this example, the cooling means comprised the same two tubes which were utilized in Example I and Example VIII and, likewise, the same splitting means 29, nozzles 49 and 50, and forming heads 30 and 31 were employed. However, the pipe volume was increased to 260 cubic inches. The product exited from the second tube of the Votator unit at a temperature of 54° F. so that the temperature between the tubes of the Votator unit was 70° F. The product exited from the forming heads 30 and 31 at a temperature of 55° F. and it had an overrun of 44 percent.

The intermediate pump 35 was operated at 127 r.p.m. and the throughput rate was 260 prints per minute. The pressure at the exit of the Votator unit was 60 pounds per square inch. The resulting product was grainy and too soft to print.

*Example XXV*

In this example, the same conditions were utilized as in the previous example except that one of the forming heads 30, one of the nozzles 49, and one-half of the Y were not used. The product had somewhat less grain than the product of the previous example but was still too soft to print.

*Example XXVI*

In this example, the same physical setup was utilized as in Example XXIV and the same conditions were employed except that the throughput rate was increased to 284 prints per minute. In addition, the intermediate pump was operated at a rate of 142 r.p.m. The product was grainy.

*Example XXVII*

The same conditions were employed in this example as in the previous example except that one-half of the Y, the nozzle 49, and the forming head 30 were not utilized. The resulting product was still grainy.

*Example XXVIII*

In accordance with this example, the same physical setup was employed as in Example XXIV but the temperature of the product out of the Votator unit was 57° F. The product exited from the forming tubes at a temperature of 59° F. The intermediate pump was operated at a rate of 139 r.p.m. and maintained a pressure at the outlet of the Votator unit at 60 pounds per square inch. The product did not retain gas and a low overrun was obtained.

*Example XXIX*

In accordance with this example, the same operating conditions prevailed as in the previous example except that one-half the Y, the nozzle 49, and the forming head 30 were not used. The product was still losing gas and a low overrun was obtained. However, the product had somewhat better grain than the product of the previous example.

*Example XXX*

The same apparatus was employed for purposes of this example as in the case of Example XXIV except that the temperature out of the Votator unit was adjusted to 60° F. so that the temperature between the tubes of the Votator unit was 76° F. The product out of the forming heads was at a temperature of 60° F. and the intermediate pump was run at a speed of 135 r.p.m. to maintain a pressure out of the cooling means 20 at 60 pounds per square inch. The product was too soft to print and was losing gas so that the desired overrun was not obtained.

When only half the Y was used and the nozzle 40 and forming head 30 were not used, the product was even softer and was, in fact, fluid in character.

*Example XXXI*

The apparatus for purposes of this example comprised a single tube of a Votator unit, the tube having the dimensions specified in Example I. The apparatus between this single tube of the Votator and the packaging machine 34 was also the same as in Example I. That is to say, the same volume of pipe 27, intermediate pump, nozzles, and forming heads were utilized as in the case of Example I. The output temperature of the Votator unit was adjusted to 50° F. and the intermediate pump 35 was operated to maintain a back pressure of 40 pounds per square inch. The throughput rate was 106 prints per minute. The resulting product was grainy and unsatisfactory.

*Example XXXII*

For purposes of this example, the same equipment was used as in the case of the previous example but the temperature out of the Votator unit was 48° F. and the throughput rate was 141 prints per minute. The intermediate pump was run at 74 r.p.m. and maintained a pressure at the outlet of the Votator of 60 pounds per square inch. Here again, the product was grainy and unsatisfactory for commercial production.

*Example XXXIII*

For the purposes of this example, the same equipment was used as in the case of the previous two examples except that the output temperature of the Votator unit was adjusted to 53° F. The product had an overrun of 47 percent and a temperature out of the forming heads 30 and 31 of 53° F. The product was less grainy than in the case of the previous example but still too grainy for satisfactory commercial production.

*Example XXXIV*

In accordance with this example the output temperature of the Votator unit was adjusted to 55° F. and the intermediate pump speed was 80 r.p.m. to maintain a pressure of 60 pounds per square inch at the outlet of the Votator unit. The throughput rate was 160 prints per minute and the overrun of the product was 54 percent. The product was somewhat grainy but had good printability and was satisfactory for commercial production.

*Example XXXV*

For purposes of this example, the same conditions prevailed as in the case of the previous example except that only one-half of the Y was utilized thereby eliminating the nozzle 49 and forming head 30 from operation. The product had good grain and good printability, and was satisfactory for commercial production.

*Example XXXVI*

In accordance with this example, the same conditions prevailed as in the case of the previous example except that the throughout rate was 188 prints per minute. The intermediate pump speed was adjusted to 90 r.p.m., thereby maintaining the pressure out of the Votator unit at 58 pounds per square inch. The product was good and satisfactory for commercial production but was slightly grainy.

Example XXXVII

For purposes of this example, the same conditions prevailed as in the case of the previous example except that only one-half of the Y was used, thereby eliminating the nozzle 49 and the forming head 30 from operating. The product was better than in the case of the previous example and was satisfactory for commercial production.

Example XXXVIII

For purposes of this example, the cooling means 20 comprised a three-tube Votator unit. The product entered the unit at about 98° F. and discharged from the first tube of the Votator unit at a temperature of 72° F., from the second tube of the Votator unit at 61° F., and from the third tube of the Votator unit at 54° F. Each tube of the Votator unit had the same dimensions as specified for the tube in Example I. The product was fed through the Votator unit at a rate of 188 prints per minute. The intermediate pump was run at 89 r.p.m. and maintained a pressure on the product out of the Votator unit of 58 pounds per square inch. The nitrogen was adjusted to give an overrun of 54 percent. The temperature of product out of forming tubes 30 and 31 was 64° F. The product was very grainy and unsatisfactory for commercial production.

Example XXXIX

For purposes of this example, the same conditions were utilized as in the case of the previous example except that only one-half the Y of the splitting means 29 was used, and the nozzle 49 and forming head 30 were not employed. The product was still very grainy, though somewhat less grainy than the product of the previous example.

Example XL

In accordance with this example, the product exited from the first tube of the Votator unit at 76° F., from the second tube at 59° F., and from the third tube at 53° F. The overrun of the product was 50 percent and the throughput rate of 256 prints per minute. The temperature of the product out of the forming heads 30 and 31 was 61° F. The intermediate pump was run at a speed of 104 r.p.m., maintaining the pressure out of the Votator unit at 60 pounds per square inch. The product was firm and had good printability.

Example XLI

The same conditions prevailed for this example as in the case of the previous example except that the nozzle 49, forming tube 30, and one-half of the Y of the splitting means 29 were not employed. The product had good grain but was somewhat soft.

Example XLII

In accordance with this example, the throughput was increased to 329 prints per minute. The product exited from the first tube of the Votator unit at 80° F., from the second tube at 62° F., and from the third tube at 53° F. The product had an overrun of 50 percent and discharged from the forming heads at 55° F. The intermediate pump was run at 152 r.p.m., maintaining a pressure out of the Votator unit of 60 pounds per square inch. The product had good grain but was somewhat soft.

When only half the Y was used and the nozzle 49 and forming head 30 were not used, the product was too soft to print.

When the output temperature of the three-tube Votator unit was dropped to 50° F. and the throughput rate maintained at 329 prints per minute the product was firm and good.

Example XLIII

Utilizing the same conditions as in the previous example except adjusting the output temperature of the three-tube Votator unit to 47° F., the product was firmer and had good printability.

Example XLIV

Utilizing the same conditions of the previous example except dropping the temperature to 45° F. out of the three-tube Votator unit, the product layered and was not satisfactory. It is clear that this low temperature can not be used for satisfactory commercial production at a rate of 329 prints per minute through this system even though the desired overrun is obtained.

Example XLV

For purposes of this example and succeeding examples, the cooling means 20 comprised a Votator unit having two tubes. Each of the tubes had a vertically extending axis and a diameter of 4.05 inches. The length of each tube was 48⅓ inches. A rotor in each tube had a diameter of 3.54 inches and on the rotors were mounted the usual scraper blades for maintaining refrigeration efficiency. The rotor was 46 inches in length and had a shaft which was 2⅜ inches in diameter. Accordingly, the total volume of each tube in which the fatty product was processed was 187 cubic inches.

In this apparatus, the splitting means 29 also comprised a Y which had a volume of 21 cubic inches. The forming heads 30 and 31 each had a volume of 31 cubic inches. A plate was disposed between the forming heads 30 and 31 and the molding heads 32 and 33 of the packaging machine 34 and each of these plates defined a volume of about 3.4 cubic inches. The pipe volume was 80 cubic inches, the pipe being 123 inches in length.

The fatty product was fed to the above cooling means 20 at a temperature of 98° F. and the nitrogen gas was adjusted to provide an overrun of about 50 percent. The product exited from the cooling means at a temperature of 35° F. and at a rate of 160 prints per minute. The temperature of the print was 45° F. as it left the molding heads 32 and 33 of the packaging machine 34. The print had good grain and good printability.

Example XLVI

In accordance with this example, the same conditions were used as in the case of the previous example except that the temperature of product out of the Votator was 32° F. The resultant product had good texture and good printability.

Example XLVII

In accordance with this example, the same conditions prevailed as in the case of Example XLV except that the temperature of product out of the Votator was about 37° F. The product was somewhat soft but had good texture.

Example XLVIII

In accordance with this example the product discharged from the cooling means 20 at a temperature of 38° F. and the packaging machine 34 was operated at a rate of 194 prints per minute. The product temperature out of the molding heads 30 and 31 was 45° F. Otherwise, the same conditions prevailed as in the case of Example XLV. The product, however, had soft ends but had good texture.

Example XLIX

In accordance with this example, the apparatus was the same as described in Example XLV but the product exited from the Votator at a temperature of 32° F. The product was printed at a rate of 120 prints per minute. The product was slightly grainy and had an overrun somewhat greater than 50 percent.

Example L

For purposes of this example, the apparatus was the same as in Example XLV except that the pipe volume was 64 cubic inches. The product exited from the Votator at a temperature of 32° F. and at a print temperature to the packaging machine 34 of 44° F. The packaging machine was operated at a rate of 168 prints per minute. The product had good grain and good printability.

*Example LI*

The same apparatus was used in the case of this example as in the case of the previous example but the product exited from the Votator unit at a temperature of 36° F. and had a print temperature of 45° F. The packaging machine was operated at a rate of 192 prints per minute and the overrun was about 50 percent. The product was too soft for satisfactory printing.

*Example LII*

In the case of this example, the same apparatus was employed as in the previous example and the product discharged from the cooling means 20 at a temperature of 35° F. The packaging machine was run at the rate of 100 prints per minute and the print temperature was 41.5° F. The product was hard and slightly grainy at the time of printing and was borderline in character.

*Example LIII*

In accordance with this example, the same apparatus was used as in the case of Example XLV except that the pipe length was increased to provide a pipe volume of 111 cubic inches which corresponded to a length of 171 inches. The product exited from the cooling means at a temperature of 34° F. and from the molding heads 30 and 31 at a temperature of 44° F. The packaging machine 34 was operated at a rate of 176 prints per minute. The product was slightly grainy and was marginal in character.

*Example LIV*

For purposes of this example, the same apparatus was employed as in the case of the previous example except that the temperature of the product out of the cooling means 20 was 33.5° F. and the packaging machine was operated at a rate of 188 prints per minute. The product overrun was about 50 percent. The product had good printability and good texture.

*Example LV*

The same conditions prevailed for this example as in the case of the previous example except that the temperature of product out of the cooling means 20 was 44° F. The product was too soft to print and such a temperature could not be used for this system. When the temperature was dropped to 42° F. and the rate of operation of the packaging machine 34 was reduced to 168 prints per minute the product was still too soft to print.

*Example LVI*

For purposes of this example, the same apparatus was used as in the case of Example LIII but the packaging machine was operated at a rate of 120 prints per minute. The product exited from the Votator unit at 32° F. and the temperature of the product from the molding heads 30 and 31 was 44° F. The nitrogen was adjusted to provide an overrun of 25 percent. The resulting product was grainy.

*Example LVII*

In accordance with this example, the same apparatus was used as in the case of Example LIII but the product exited from the cooling means 20 at a temperature of 38° F. The packaging machine 34 was operated at a rate of 160 prints per minute and the product left the molding heads 32 and 33 at a temperature of 42° F. The overrun was 25 percent. The product was very grainy and layered.

*Example LVIII*

The same apparatus was used for this example as for Example LIII but the product exited from the Votator unit at a temperature of 31° and was printed at a temperature of 42° F. The packaging machine was operated at a rate of 120 prints per minute and the product had an overrun of 50 percent. The product was very grainy and unsatisfactory for commercial production.

The temperature of product out of the Votator unit was raised to 36° F. and the product had slight grain and was marginal for commercial production.

The temperature was further raised to 40° F. and the product had good grain and good printability.

*Example LIX*

In preparing the product for the purposes of this example, two packaging machines 34 were employed in parallel. The apparatus was generally similar to that shown in the drawing except that two intermediate pumps 35 were employed and two packaging machines 34 were fed from the pumps, each pump feeding a machine. The equipment between the intermediate pumps and the packaging machine was identical with that schematically illustrated in the drawing.

The cooling means 20 comprised a three-tube Votator unit, each tube having a horizontally extending axis and having the dimensions specified in Example I. The product was fed to each machine at a rate of 210 prints per minute. The intermediate pumps, the Y of the splitting means 29, the nozzles 49 and 50, the forming heads 30 and 31 had the same dimensions as set forth in connection with Example I. The pipe volume was about 120 cubic inches for the pipe from each pump to each machine.

Excellent prints resulted when the temperature out of the cooling means was about 48° F., but product satisfactory for commercial production could be obtained at temperatures from about 43° F. to about 52° F. At a lower temperature the product became grainy at this throughput rate, while at temperatures higher than about 52° F. the product became too soft to print. Thus, it will be seen that there was about a nine degree range in which satisfactory printing of the product could be accomplished for the specified throughput rate and apparatus.

*Example LX*

In accordance with this example, the cooling means 20 comprised a single tube Votator unit, the tube having the dimensions specified in Example I. The connecting means between the Votator unit and packaging machine 34 included a pipe having a volume of 101 cubic inches which corresponds to a length of 156 inches. The splitting means 29 comprised a Y having a volume of 21 cubic inches and two forming heads 30 and 31, each of which had a volume of 31 cubic inches. A plate was disposed between the forming heads 30 and 31 and the molding heads 32 and 33, the plates each defining a volume of 3.4 cubic inches.

When the output temperature of the product, at 50 percent overrun, was 44° F. and the throughput rate was 100 prints per minute, the product was coarse. When the throughput rate was raised to 120 prints per minute there was only slight grain in the product. When the throughput rate was increased to 135 prints per minute the product was satisfactory for printing and the product had good grain.

As before indicated, the forming heads 30 and 31 are jacketed and heated with warm water. In each of the foregoing examples, the forming heads were heated with water at a temperature of between about 70° F. and about 120° F. These temperatures vary, as before pointed out, with throughput rate and the heat conductivity of the metal.

In each of the foregoing examples, the rotors in the cooling means 20 were rotated.

In addition, in each of the foregoing examples the equipment was operated in a room which was maintained at a temperature of about 65° F. The room conditions were controlled and the temperature did not exceed about 75° F.

It has been found that the pressure at the outlet of the cooling means 20 should be maintained above about 40 pounds per square inch. When the pressure at this point was lower than 40 pounds per square inch, the product lost gas. As has been before indicated, this pressure can be maintained by suitable operation of the intermediate pump 35. It has been found that any higher pressure can be utilized without substantially affecting the product within the cooling means 20. It has also been found that there should be some positive pressure at the end of the forming heads 30 and 31. In this connection, the pressure should exceed about 2 pounds per square inch. However, if the pressure exceeds about 20 pounds per square inch, it was found, in connection with the foregoing examples, that the product was grainy, deformed in the molding heads and discolored.

The packaging machine 34, which includes the molding heads 32 and 33, comprises a reciprocating mold or printer which moves vertically. In one station, the whipped fatty product is received from the forming heads 30 and 31. As the mold moves upwardly it cuts off the product from the forming heads 30 and 31 and delivers a rectangularly shaped print to a second station wherein the print is pushed against wrapping material, thereby causing this material to wrap around the print.

The forming heads are so located to feed the product directly into the molding heads and the exit end of the forming heads have two dimensions of the print. Thus, the molding head does not form the print but it merely cuts off the print from a slab of product which is formed in the forming heads 30 and 31.

The forming heads 30 and 31 can vary in length from about one inch to as long as one foot in length. A forming head which is six inches in length provides highly satisfactory operation. Longer forming heads can be used but they should not be of sufficient length to result in melting the surface of the product because of the jacket heat. While shorter forming heads can also be used, such shortening results in criticality of operation of the equipment. In other words, the product is desirably pre-formed so that variations in the output temperature of the cooling means 20 do not cause variations in the quality of the print. Thus, the longer forming heads provide flexibility of operation and assure practical commercial operation.

The cooling means 20 can be flooded with refrigerant at atmospheric pressure or the refrigerant may be under pressure. These techniques are well known in the refrigeration art and are not particularly significant for purposes of this invention.

It will, however, be noted that other cooling means than the Votator unit can be utilized for purposes of this invention. In general, such cooling means should provide rapid chilling of the fatty product with violent agitation so that the product does not instantaneously set up. Other cooling means which may be used include ice cream freezers, etc.

Larger sized pipes were tried in conducting the product from the cooling means 20 to the packaging machine 34. However, when a three inch pipe was employed, the product "cored" down the center leaving an annular ring of set product along the inner surface of the pipe. A similar phenomena occurred with the use of a two inch pipe. In general, it has been found that a one inch pipe is about the best pipe size to be employed, though pipes of one and one-half inches have been employed.

The coring of the product can be limited by heating of the pipe at various points to overcome such difficulty. However, this results in added expense and operational difficulties. Accordingly, pipes smaller than one and one-half inches are most practical for commercial operation. Furthermore, increases in the diameter of the pipe cause the volume to increase by the square of the diameter. Accordingly, for the holding times between the cooling means 20 and packaging machine 34 contemplated for this invention, the smaller pipes are more desirable for permitting the packaging machine to be spaced a satisfactory distance from the cooling means 20.

The foregoing examples well illustrate that for a given cooling means 20 and a given volume between the cooling means and packaging machine 34, there is an operating range of temperatures which can be employed for providing satisfactory printing of a whipped fatty product. This operating range is a function of the type of cooling means employed, output temperature of the cooling means, the volume of pipe and other equipment intermediate the cooling means and the packaging machine 34, and other factors. The throughput rate and volume between the cooling means and packaging machine, of course, determine the time which the margarine resides in the cooling means 20 enroute to the packaging machine 34.

In general, the temperature out of the cooling means 20 can vary between about 30° F. and about 60° F., providing the residence time of product in the pipe and equipment between the cooling means and packaging machine is adjusted to accommodate the product for a time suitable to provide in the packaging machine a printable product having good texture.

While the theory of the process of this invention is not wholly understood, it is believed necessary that the product, once it sets up should not be worked to any degree, as by changing its shape or manipulating it. In other words, in the equipment described, the product should arrive at the forming heads 30 and 31 at about the time at which it sets up. Once it is set up in the forming heads 30 and 31 the product is cut off in the molding heads 32 and 33 but there is no substantial working, shaping or manipulation of the product. That is to say, the product is not reformed, remolded, or otherwise manipulated in respect of itself upon entering the molding head. The heating of the forming heads facilitates the movement of the product through the forming head without manipulation of the product. Of course, if the product arrives at the forming heads and leaves the forming heads before it is substantially set, it is too soft to print in the molding head. Accordingly, it will be necessary to provide additional pipe to prevent the product from being too soft at the molding head. Of course, if the product is initially too soft and is not cooled to the desired degree it may not set up for a quite extended period and such limited cooling of the product in the cooling means is not practical for commercial operations.

The factors which are involved in determining the time in which the product sets up between the cooling means and the packaging machine are quite complex. In this connection, it is believed that the rate of cooling in the cooling means, the extent of cooling in the cooling means, the degree of agitation in the cooling means, the rate of travel or velocity of the product in the pipe 27, and other factors are involved in ascertaining the setting time of the product between the cooling means 20. These factors and conditions will vary from cooling unit to cooling unit and even within the same cooling unit. For this reason, extensive examples have been set up above to provide those skilled in the art with sufficient information for determining the relative throughput rates, output temperatures, and pipe volumes between the cooling means 20 and the packaging machine 34.

This invention makes possible the packaging of whipped fatty product on conventional packaging equipment. The product has excellent texture and is being sold commercially throughout the United States.

The various features of this invention which are believed to be new are set forth in the following claims.

We claim:

1. A process for manufacturing a whipped fatty product emulsion, whipped to an overrun in excess of about 20 percent and comprising about 80 percent fat which is substantially solid at room temperature, the process comprising the steps of chilling the whipped emulsion to a temperature below about 60° F., with violent agitation, holding the chilled emulsion for a period sufficient to permit setting of the fatty product emulsion, transporting the fatty product emulsion during said holding period, substantially terminating working of the fatty product emulsion upon setting to prevent coarseness in the product, and cutting the set fatty product emulsion.

2. A process for manufacturing a whipped fatty product emulsion whipped to an overrun in excess of about 20 percent and comprising about 80 percent fat which is substantially solid at room temperature, the process comprising the steps of rapidly chilling the whipped emulsion to a temperature below about 57° F. with violent agitation, holding the chilled fat emulsion for a time sufficient to permit setting of the fatty product emulsion, transporting the fatty product emulsion during said holding period, substantially terminating working of the fatty product emulsion upon setting to prevent coarseness of the product, cutting the set fatty product emulsion and wrapping the fatty product emulsion with a wrapper.

3. A process for manufacturing a whipped fatty product emulsion whipped to an overrun in excess of about 20 percent and less than about 200 percent and comprising about 80 percent fat which is substantially solid at room temperature, the process comprising the steps of chilling the whipped fat emulsion to a temperature below about 60° F. with violent agitation, holding the chilled fat emulsion for a time sufficient to permit setting of the fatty product emulsion, transporting the fatty product emulsion during said holding period, forming the fatty product emulsion in a slab promptly upon setting and substantially terminating working upon setting to prevent coarseness in the product, and cutting the set fatty product emulsion.

4. A process for manufacturing a whipped fatty product emulsion whipped to an overrun in excess of about 20 percent and less than about 200 percent and comprising about 80 percent fat which is substantially solid at room temperature, the process comprising the steps of rapidly chilling the whipped fat emulsion to a temperature below about 60° F. with violent agitation, holding the chilled fat emulsion for a period sufficient to permit setting of the fatty product emulsion, transporting the fatty product emulsion during said holding period, forming the fatty product emulsion in a slab promptly upon setting and substantially terminating working upon setting to prevent coarseness in the product, warming the slab surface to facilitate its movement and cutting the set fatty product emulsion.

5. A process for manufacturing a whipped fatty product emulsion whipped to an overrun in excess of about 20 percent and less than about 200 percent and comprising about 80 percent fat which is substantially solid at room temperature, the process comprising the steps of rapidly chilling the whipped fat emulsion to a temperature below about 60° F. and above about 30° F. with violent agitation, holding the chilled fat emulsion for a period sufficient to permit setting of the fatty product emulsion, transporting the fatty product emulsion during said holding period, forming the fatty product emulsion in a slab promptly upon setting and substantially terminating working upon setting to prevent coarseness in the product, warming the slab surface to facilitate its movement, and cutting the set fatty product emulsion.

6. A process for manufacturing a whipped fatty product emulsion whipped to an overrun in excess of about 20 percent and less than about 200 percent and comprising about 80 percent fat which is substantially solid at room temperature, the process comprising the steps of chilling the whipped fat emulsion to a temperature below about 60° F. with violent agitation, holding the chilled fat emulsion for a time sufficient to permit setting of the fatty product emulsion, transporting the fatty product emulsion during said holding period at such rate as to prevent setting of the fatty product emulsion during transport, promptly setting the fatty product emulsion in a slab and substantially terminating working upon setting to prevent coarseness in the product, and cutting the set fatty product emulsion.

7. A process for manufacturing a whipped fatty product emulsion whipped to an overrun in excess of about 20 percent and less than about 200 percent and comprising about 80 percent fat which is substantially solid at room temperature, the process comprising the steps of rapidly chilling the whipped fat emulsion to a temperature below about 60° F. and above about 30° F. with violent agitation, holding the chilled fat emulsion for a period sufficient to permit setting of the fatty product emulsion, transporting the fatty product emulsion during said holding period with sufficient agitation to prevent localized setting of product, promptly setting the fatty product emulsion in a slab and substantially terminating working upon setting to prevent coarseness in the product, warming the slab surface to facilitate its movement, and cuting the set fatty product emulsion.

References Cited in the file of this patent

UNITED STATES PATENTS

| | | |
|---|---|---|
| 1,749,427 | Hoffman et al. | Mar. 4, 1930 |
| 2,705,203 | Heidrich et al. | Mar. 29, 1955 |